US012692457B2

(12) United States Patent
Ravichandiran et al.

(10) Patent No.: US 12,692,457 B2
(45) Date of Patent: Jul. 28, 2026

(54) SOLAR PANEL CLEANING FORMULATION

(71) Applicant: HINDUSTAN PETROLEUM CORPORATION LIMITED, Bengaluru (IN)

(72) Inventors: Palanisamy Ravichandiran, Bengaluru (IN); Pankaj Patel, Bengaluru (IN); Siva Kesava Raju Chinthalapati, Bengaluru (IN); Sheshachala Srinivasa Narasimha, Bengaluru (IN)

(73) Assignee: HINDUSTAN PETROLEUM CORPORATION LIMITED, Bengaluru (IN)

( * ) Notice: Subject to any disclaimer, the term of this patent is extended or adjusted under 35 U.S.C. 154(b) by 262 days.

(21) Appl. No.: 18/662,825

(22) Filed: May 13, 2024

(65) Prior Publication Data

US 2025/0283010 A1 Sep. 11, 2025

(30) Foreign Application Priority Data

Mar. 7, 2024 (IN) ............................ 202441016309

(51) Int. Cl.

| | |
|---|---|
| ***C11D 1/00*** | (2006.01) |
| ***C11D 1/29*** | (2006.01) |
| ***C11D 3/04*** | (2006.01) |
| ***C11D 3/20*** | (2006.01) |
| ***C11D 3/24*** | (2006.01) |
| ***C11D 3/32*** | (2006.01) |
| ***C11D 3/34*** | (2006.01) |
| ***C11D 3/43*** | (2006.01) |

(Continued)

(52) U.S. Cl.
CPC ................ *C11D 1/29* (2013.01); *C11D 3/042* (2013.01); *C11D 3/2082* (2013.01); *C11D 3/24* (2013.01); *C11D 3/323* (2013.01); *C11D 3/349* (2013.01); *C11D 3/43* (2013.01); *C11D 3/48* (2013.01); *C11D 17/0008* (2013.01); *C11D 2111/22* (2024.01)

(58) Field of Classification Search
CPC ......... C11D 1/29; C11D 3/042; C11D 3/2082; C11D 3/24; C11D 3/323; C11D 3/349; C11D 3/43; C11D 3/48; C11D 17/0008; C11D 2111/22; C11D 2111/14; C11D 2111/20; C07D 279/36
USPC .......................................................... 510/175
See application file for complete search history.

(56) References Cited

U.S. PATENT DOCUMENTS

2009/0183755 A1* 7/2009 Jekel ........................ C11D 3/43 510/226
2021/0246401 A1* 8/2021 Nagel .................. C11D 3/2079

FOREIGN PATENT DOCUMENTS

CN 101481824 B 12/2012
CN 103442567 A * 12/2013 .............. A61P 31/12
CN 115023489 A * 9/2022 ............. C11D 3/042

(Continued)

OTHER PUBLICATIONS

STIC Search Report dated Mar. 24, 2026.*

*Primary Examiner* — Eisa B Elhilo
(74) *Attorney, Agent, or Firm* — The Belles Group, P.C.

(57) ABSTRACT

Solar panel cleaning formulations are disclosed herein. In accordance with some aspects, provides is a solar panel cleaning formulation that comprises a surfactant, urea, a mild acid, an antimicrobial agent and water. In some cases, the solar panel cleaning formulation comprises an antimicrobial agent comprising a novel antibacterial compound disclosed herein.

16 Claims, 4 Drawing Sheets

Before treatment

After treatment

(51) Int. Cl.
*C11D 3/48* (2006.01)
*C11D 17/00* (2006.01)

(56) References Cited

FOREIGN PATENT DOCUMENTS

| | | | | | |
|---|---|---|---|---|---|
| DE | 19945506 | A1 * | 4/2001 | ............... | C11D 3/48 |
| DE | 102013006941 | A1 | 10/2014 | | |
| JP | 2010511763 | A * | 4/2010 | ............... | C11D 3/48 |
| WO | 2010120902 | A2 | 10/2010 | | |
| WO | WO 2014139984 | A1 * | 9/2014 | ............. | C11D 3/362 |

* cited by examiner

Before treatment After treatment

SR-01

SR-02

SOLAR PANEL CLEANING FORMULATION

CROSS-REFERENCE TO RELATED PATENT APPLICATIONS

The present application is a U.S. patent application claiming priority to Indian Application No. 202441016309, filed Mar. 7, 2024, the disclosure of which is incorporate herein by reference in its entirety for all purposes.

FIELD OF THE INVENTION

The present invention relates to solar panel cleaning formulations. In accordance with some aspects of the invention, provided is a solar panel cleaning formulation comprising a surfactant, urea, a mild acid, an antimicrobial agent and water. In accordance with another aspect of the invention, provided is a novel antibacterial compound for use as an antimicrobial agent in the solar panel cleaning formulation.

BACKGROUND OF THE INVENTION

Dust and microbial fouling pose a challenge to the penetration of sunlight through the glass cover of photovoltaic (PV) modules, limiting the effectiveness of the solar cell. When photons from sunlight reach the semiconductor surface, they can be absorbed by the material. This absorption can lead to the exciting of an electron from the valence band to the conduction band, generating power for the solar panel. However, if the solar panel is covered in dust particles, the semiconducting material cannot absorb the photons effectively, resulting in either reflection or transmission of the photons from the surface and causing power loss.

The challenge of sand particle deposition on the glass surface of photovoltaic solar panels is a critical issue faced by solar cell operations in sandy areas. Recent research has revealed that even a small accumulation of 4 $g/m^2$ of dust can lead to a significant 40% decrease in power output. Studies conducted in Egypt have further highlighted the impact of dust particles on the efficiency and performance of solar systems, showing a monthly reduction of approximately 17.4% in power generation when panels are positioned at a 45° angle facing south. Additionally, a separate study conducted on a photovoltaic park located on the island of Crete found an annual power loss of 5.86% due to dust deposition.

Microbial fouling poses a significant challenge due to the build-up of particles and microbial growth, impacting efficiency, especially in dry periods common during the summer months with increased solar activity. Various sources such as sea salt, pollen, and particulate matter from agricultural, industrial, and natural activities accumulate on solar panels, affecting their performance. Dust particles ranging from 2-10 μm in size reduce solar radiation intensity, while rain has limited cleaning effects on larger particles. The similarity in size between these particles and microbial cells suggests that subaerial biofilms may contribute to the decline in photovoltaic system performance through light absorption or scattering.

The liquid cleaning method is a promising technique among various cleaning systems available for solar panel cleaning. It offers the potential to reduce power consumption, cost, and labor work significantly. While water is commonly used to clean the dust on solar panels, it has not shown appreciable improvement in panel efficiency. Recent investigations have revealed that cleaning with non-pressurized water leads to a decrease in PV panel efficiency by 0.14% per day, and a staggering 50% decrease after 45 days of water-only cleaning. Therefore, non-pressurized water cleaning is not an effective method. Additionally, the use of water for solar panel cleaning poses a disadvantage in gulf countries where water scarcity is a concern.

CN101481824, introduces a chemical technique for eliminating graphite impurities from the surface of polycrystalline silicon. This method involves immersing the polycrystalline silicon material in a solution containing sulfuric acid, potassium permanganate, and sodium nitrate. As a result, the treated polycrystalline silicon material meets the standards set by the solar-energy industry.

DE102013006941 discusses the applicability of transparent surfaces, specifically solar and photovoltaic systems, with a focus on the impact of Cu ions. The solar cell module is equipped with a Cu strip on its upper section, allowing rain or irrigation to wash the surface and release copper ions.

WO2010120902 outlines methods and cleaning solutions for cleaning a glass substrate, particularly for removing metal ion contaminants from a glass substrate with a transparent conductive oxide layer in solar cell manufacturing. One approach involves: furnishing a glass substrate with a transparent conductive oxide layer; and exposing the glass substrate to a cleaning solution comprising 0.5% to 5% organic acid, with citric acid, HOAc, or oxalic acid being the organic acids used.

Hence, there exists a need for an enhanced formulation for cleaning solar panels that tackles the mentioned issues impacting the efficiency of PV panels resulting from the use of previously known products. The formulations disclosed herein should possess superior qualities such as high voltage output, improved antimicrobial properties, and low-corrosive behavior, thereby offering superior performance.

OBJECTIVES OF CERTAIN EMBODIMENTS OF THE PRESENT INVENTION

An objective of certain embodiments of the present invention is to provide a solar panel cleaning formulation.

Another objective of certain embodiments of the present invention is to provide a solar panel cleaning formulation that comprises a surfactant, urea, a mild acid, an antimicrobial agent and water.

A further objective of certain embodiments of the present invention is to provide a solar panel cleaning formulation that comprises a surfactant, urea, a mild acid, an antimicrobial agent comprising a novel antibacterial compound (e.g., antibacterial compound (5) disclosed herein) and water.

Yet a further objective of certain embodiments of the present invention is to provide novel antibacterial compounds (e.g., antibacterial compound of formula (5)).

In yet another objective of certain embodiments of the present invention, provided is a process for the preparation of novel antibacterial compounds (e.g., antibacterial compound of formula (5)).

In yet an additional objective of certain embodiments of the present invention, provided is a solar panel cleaning formulation that shows high cleaning efficiency in terms of higher voltage output, better antimicrobial activity and low-corrosive properties.

SUMMARY OF THE PRESENT INVENTION

This summary is provided to introduce a selection of concepts, in a simplified format, that are further described in the detailed description of the invention. This summary is neither intended to identify key or essential inventive concepts of the invention nor is it intended to determine the scope of the invention.

In one of the embodiments, the present invention provides a solar panel cleaning formulation, comprising; a surfactant, urea, a mild acid, an antimicrobial agent and water.

In one of the embodiments, the present invention provides a solar panel cleaning formulation, comprising; a surfactant, urea, a mild acid, an antimicrobial agent and water, wherein, the surfactant is in a range of 0.6-0.8%, the urea is in a range of 0.2-0.3%, the mild acid is in a range of 0.6-0.7%, the antimicrobial agent is in a range of 0.1-0.2%, and water is about 98%, wherein all the percentages are weight percentages relative to the total weight of the solar panel cleaning formulation.

In yet another embodiment, the present invention provides a solar panel cleaning formulation, wherein the surfactant includes one or more cationic surfactants or anionic surfactants selected from the group consisting of behentrimonium chloride, benzalkonium chloride, benzethonium chloride, benzododecinium bromide, carbethopendecinium bromide, cetalkonium chloride, cetrimide, cetrimonium bromide, cetrimonium chloride, cetylpyridinium chloride, didecyldimethylammonium chloride, dimethyldioctadecylammonium bromide, dimethyldioctadecylammonium chloride, dioleoyl-3-trimethylammonium propane, domiphen bromide, ethyl lauroyl arginate, lauryl methyl gluceth-10 hydroxypropyl dimonium chloride, octenidine dihydrochloride, olaflur, n-oleyl-1,3-propanediamine, pahutoxin, stearalkonium chloride, tetramethylammonium hydroxide, thonzonium bromide, 2-acrylamido-2-methylpropane sulfonic acid, alkylbenzene sulfonate, ammonium lauryl sulfate, ammonium perfluorononanoate, chlorosulfolipid, disodium cocoamphodiacetate, docusate, magnesium laureth sulfate, α-olefin sulfonate, perfluorobutanesulfonic acid, perfluorodecanoic acid, perfluorohexanesulfonic acid, perfluorononanoic acid, perfluorooctanesulfonic acid, perfluorooctanoic acid, perfluoropropanesulfonic acid, phospholipid, potassium lauryl sulfate, sodium dodecyl sulfate, sodium laurate, sodium lauryl ether sulfate, sodium lauroyl sarcosinate, sodium myreth sulfate, sodium nonanoyloxybenzenesulfonate, sodium pareth sulfate, sodium stearate, sodium sulfosuccinate esters, sodium tetradecyl sulfate, sulfolipid, cetyltrimethyl ammonium bromide and a combination thereof.

In a preferred embodiment, the present invention provides a solar panel cleaning formulation, wherein the surfactant includes one or more cationic surfactants or anionic surfactants selected from the group consisting of cetylpyridinium chloride, cetyltrimethyl ammonium bromide, sodium lauryl ether sulfate, benzalkonium chloride, Ammonium lauryl sulfate, sodium pareth sulfate and a combination thereof.

In another embodiment, the present invention provides a solar panel cleaning formulation, wherein the mild acid includes one or more selected from the group consisting of acetic acid, citric acid, formic acid, o-phosphoric acid, acetylsalicylic acid, carbonic acid, phosphorous acid and a combination thereof.

In a preferred embodiment, the present invention provides a solar panel cleaning formulation, wherein the mild acid includes one or more selected from the group consisting of citric acid, o-phosphoric acid, formic acid, and a combination thereof.

In yet another embodiment, the present invention provides a solar panel cleaning formulation, wherein the antimicrobial agent is selected from the group consisting of chloramphenicol, macrolides, tetracycline, aminglycoside, beta-lactam derivatives, ketoconazole, miconazole, penicillin, sulphonamides, vancomycin, phenothiazines, phenoxazines, carbazoles and a combination thereof. In a preferred embodiment, the present invention provides a solar panel cleaning formulation, wherein the antimicrobial agent is selected from the group consisting of phenothiazines, phenoxazines, carbazoles, sulphonamides and a combination thereof.

In a preferred embodiment, the present invention provides solar panel cleaning formulation, wherein the antimicrobial agent is based on phenothiazine compounds.

In preferred embodiments, the present invention provides a solar panel cleaning formulation, comprising; cetyl pyridinium chloride, sodium lauryl ether sulfate, urea, citric acid, phosphoric acid, phenothiazine based antimicrobial agent and water.

In another embodiment, the invention provides a solar panel cleaning formulation, wherein the cetyl pyridinium chloride is in a range of 0.3-0.4%, the sodium lauryl ether sulfate is in a range of 0.3-0.4%, the urea is in a range of 0.2-0.3%, the citric acid is in a range of 0.25-0.35%, phosphoric acid is in a range of 0.25-0.35%, phenothiazine based antimicrobial agent is in a range of 0.1-0.2%, and water is 98%, e.g., wherein all the percentages are weight percentages relative to the total weight of the solar panel cleaning formulation.

In yet one of the embodiments, the present invention provides a solar panel cleaning formulation, comprising cetyltrimethyl ammonium bromide, sodium lauryl ether sulfate, urea, citric acid, phosphoric acid, phenothiazine based antimicrobial agent and water.

In yet one of the embodiments, the present invention provides a solar panel cleaning formulation, wherein cetyltrimethyl ammonium bromide in a range of 0.3-0.4%, sodium lauryl ether sulfate in a range of 0.3-0.4%, urea in a range of 0.2-0.3%, citric acid in a range of 0.25-0.35%, phosphoric acid in a range of 0.25-0.35%, phenothiazine based antimicrobial agent in a range of 0.1-0.2%, and water is 98%, wherein all the percentages are weight percentages relative to the total weight of the solar panel cleaning formulation.

In a preferred embodiment, the invention provides a solar panel cleaning formulation, wherein the antimicrobial agent is 4-(tert-butyl)-N-(4-(4-(5-oxo-5H-benzo[a]phenothiazin-6-ylamino)phenylsulfonyl)phenyl)benzamide or a compound of formula (5).

In yet one of the embodiments, the present invention provides a compound having the chemical formula: $C_{39}H_{31}N_3O_4S_2$.

In yet one of the embodiments, the present invention provides a compound having a structure according to formula (5)

(5)

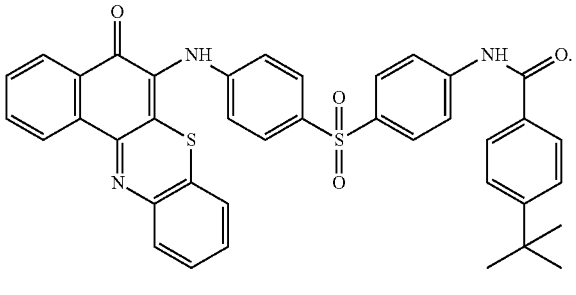

In another embodiment, the present invention provides a process for preparation of compound of formula (5), the process comprising:

a) adding 2,3-dichloro-1,4-naphthoquinone (1), 4-aminophenyl sulfone (2) and 900 mL double distilled deionized water to obtain a first reaction mixture;
b) refluxing the first reaction mixture for 3 hours to obtain a compound 2-((4-((4-aminophenyl) sulfonyl)phenyl) amino)-3-chloronaphthalene-1,4-dione (3);
c) dissolving compound (3) and 2-aminothiophenol in 500 mL of acetonitrile to obtain a second reaction mixture;
d) refluxing the second reaction mixture with potassium carbonate for 2 hours to obtain a compound (4) 6-(4-(4-aminophenylsulfonyl)phenylamino)-5H-benzo[a] phenothiazin-5-one;
e) dissolving compound (4) and 4-tert-butylbenzoyl chloride in 250 mL of dried acetone to obtain a third reaction mixture; and
f) refluxing the third reaction mixture for 30 minutes by constant stirring to obtain the compound (5) 4-(tert-butyl)-N-(4-(4-(5-oxo-5H-benzo[a]phenothiazin-6-ylamino)phenylsulfonyl)phenyl)benzamide.

BRIEF DESCRIPTION OF THE ACCOMPANYING DRAWINGS

These and other features, aspect, and advantages of the present invention will become better understood when the following detailed description is read with reference to the accompanying drawings in which like characters represent like parts throughout the drawings are explained in more detail with reference to the following drawings.

DETAILED DESCRIPTION OF THE INVENTION

Figure 1:
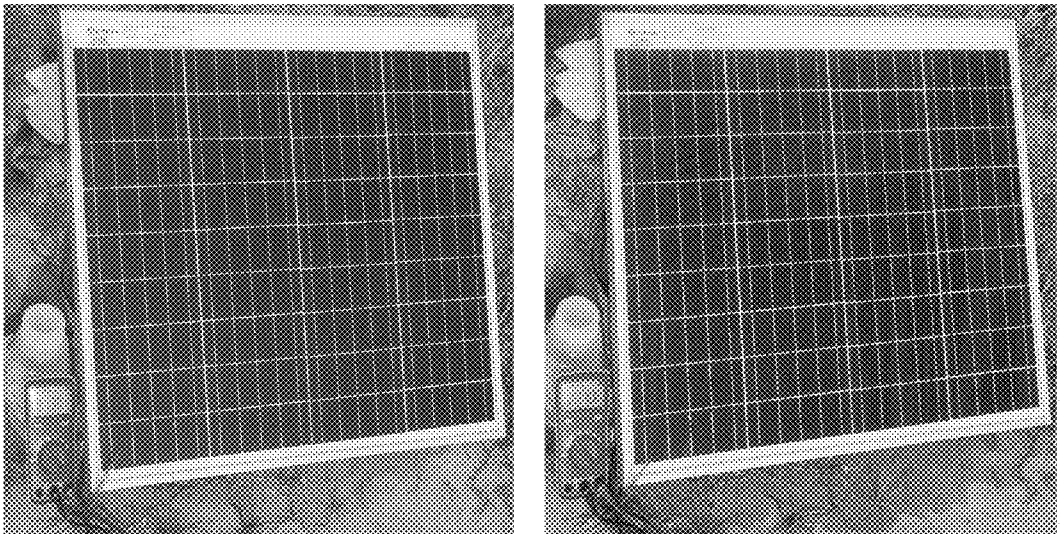
FIG. 1 illustrates the voltage measurement study in the solar panel before and after cleaning with the formulation.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates. Unless otherwise defined, all technical and scientific terms used herein have the same meaning as commonly understood by one of ordinary skilled in the art to which this invention belongs. The system, methods, and examples provided herein are illustrative only and not intended to be limiting.

Before the present process and methods are described, it is to be understood that this invention is not limited to compounds, formulas, or steps described, as such may, of course, vary. It is also to be understood that the terminology used herein is to describe particular embodiments only and is not intended to be limiting.

Although any methods and materials similar or equivalent to those described herein can also be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "and", and "the" include plural referents unless the context dictates otherwise. Thus, for example, reference to "a compound" includes a plurality of such compounds, and reference to "the step" includes reference to one or more steps and equivalents thereof known to those skilled in the art, and so forth.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments." The terminology and structure employed herein is for describing, teaching and illuminating some embodiments and their specific features and elements and does not limit, restrict or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art.

Reference is made herein to some "embodiments." It should be understood that an embodiment is an example of a possible implementation of any features and/or elements presented in the attached claims. Some embodiments have been described for the purpose of illuminating one or more of the potential ways in which the specific features and/or elements of the attached claims fulfil the requirements of uniqueness, utility and non-obviousness.

Use of the phrases and/or terms such as but not limited to "a first embodiment," "a further embodiment," "an alternate embodiment," "one embodiment," "an embodiment," "multiple embodiments," "some embodiments," "other embodiments," "further embodiment", "furthermore embodiment", "additional embodiment" or variants thereof do NOT necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should NOT be necessarily taken as limiting factors to the attached claims. The attached claims and their legal equivalents can be realized in the context of embodiments other than the ones used as illustrative examples in the description below.

Embodiments of the present invention will be described below in detail with reference to the accompanying drawings.

In accordance with certain aspects of the present invention, provided is a solar panel cleaning formulation, comprising; a surfactant, urea, a mild acid, an antimicrobial agent and water. The solar panel cleaning formulation may achieve high cleaning efficiency in terms of higher voltage output, better antimicrobial activity and low-corrosive properties. In some embodiments of the present invention, the solar panel cleaning formulation comprises a surfactant, urea, a mild acid, an antimicrobial agent comprising a novel antibacterial compound and water. In accordance with another aspect of the present invention, provided is a novel antibacterial compound (e.g., the antibacterial compound of formula (5)). In accordance with a further aspect of the present invention, provided is a process for the preparation of the novel antibacterial compound of formula (5). In certain embodiments of the present invention, provided is a solar panel cleaning formulation that comprises a surfactant, urea, a mild acid, an antimicrobial agent comprising a novel antibacterial compound of formula (5) and water.

Generally, the solar panel cleaning formulations, also referred to as formulation/s are often the mixture of various surfactants, acids and other related corrosion/antimicrobial agents. Many solar panel cleaning formulations are containing anionic or cationic surfactants with mild to strong acids.

Considering the same, a series of cleaning formulations containing one or more of the following four categories were developed:

The solar panel cleaning formulation of the present invention comprises a surfactant, urea, a mild acid, an antimicrobial agent and water.

In one of the embodiments, the invention provides a solar panel cleaning formulation, comprising; a surfactant, urea, a mild acid, an antimicrobial agent and water, wherein, the surfactant is in a range of 0.6-0.8%, the urea is in a range of 0.2-0.3%, the mild acid is in a range of 0.6-0.7%, the antimicrobial agent is in a range of 0.1-0.2%, and water is 98%, e.g., wherein all the percentages are weight percentages relative to the total weight of the solar panel cleaning formulation.

Surfactants: The surfactants were added to decrease the surface and interfacial tension of water to clean any precipitation/aggregation of the organic and inorganic deposits. The used surfactant can quench the metal and trap it, however, the presence of metals is less in deposits.

In yet one of the embodiments, the invention provides a solar panel cleaning formulation, wherein the surfactant includes one or more cationic surfactants or anionic surfactants selected from the group consisting of behentrimonium chloride, benzalkonium chloride, benzethonium chloride, benzododecinium bromide, carbethopendecinium bromide, cetalkonium chloride, cetrimide, cetrimonium bromide, cetrimonium chloride, cetylpyridinium chloride, didecyldimethylammonium chloride, dimethyldioctadecylammonium bromide, dimethyldioctadecylammonium chloride, dioleoyl-3-trimethylammonium propane, domiphen bromide, ethyl lauroyl arginate, lauryl methyl gluceth-10 hydroxypropyl dimonium chloride, octenidine dihydrochloride, olaflur, n-oleyl-1,3-propanediamine, pahutoxin, stearalkonium chloride, tetramethylammonium hydroxide, thonzonium bromide, 2-acrylamido-2-methylpropane sulfonic acid, alkylbenzene sulfonate, ammonium lauryl sulfate, ammonium perfluorononanoate, chlorosulfolipid, disodium cocoamphodiacetate, docusate, magnesium laureth sulfate, α-olefin sulfonate, perfluorobutanesulfonic acid, perfluorodecanoic acid, perfluorohexanesulfonic acid, perfluorononanoic acid, perfluorooctanesulfonic acid, perfluorooctanoic acid, perfluoropropanesulfonic acid, phospholipid, potassium lauryl sulfate, sodium dodecyl sulfate, sodium laurate, sodium lauryl ether sulfate, sodium lauroyl sarcosinate, sodium myreth sulfate, sodium nonanoyloxybenzenesulfonate, sodium pareth sulfate, sodium stearate, sodium sulfosuccinate esters, sodium tetradecyl sulfate, sulfolipid, cetyltrimethyl ammonium bromide and a combination thereof.

In yet one of the embodiments, the invention provides a solar panel cleaning formulation, wherein the surfactant includes one or more cationic surfactants or anionic surfactants selected from the group consisting of cetylpyridinium chloride, cetyltrimethyl ammonium bromide sodium lauryl ether sulfate, benzalkonium chloride, ammonium lauryl sulfate, sodium pareth sulfate and a combination thereof Mild acids: Mild acids including citric acid are acting as a chelating agent, besides, it is also effective at removing soap scum, calcium deposits, hard water stains and rust. Moreover, it works as a preservative in cleaning formulations. Phosphoric acid is also used in the formulation which removes water hardness, milk stone deposits and other oxide films safely.

In yet one of the embodiments, the invention provides a solar panel cleaning formulation, wherein the mild acid includes one or more selected from the group consisting of acetic acid, citric acid, formic acid, o-phosphoric acid, acetylsalicylic acid, carbonic acid, phosphorous acid and a combination thereof.

In yet one of the embodiments, the invention provides solar panel cleaning formulation, wherein the mild acid includes one or more selected from the group consisting of citric acid, o-phosphoric acid, formic acid, and a combination thereof.

Urea: Urea has all the required properties of a chemical cleaning agent; hence it is capable of removing biofilm, i.e., it dissolves the formed fouling layer, and deferments of fresh fouling accumulation by preventing the deposition of more viscous extracellular polymeric substances. Moreover, it does not cause any damage to the solar surface due to its high chemical stability.

Antimicrobial agent: An antimicrobial agent is a natural or synthetic substance that kills/inhibits the growth of microorganisms such as bacteria, fungi and algae. Sodium benzoate is one of the well-known and readily available microbial inhibitors that was used in the current formulation to kill or inhibit microbial growth on the solar panel surfaces.

In yet one of the embodiments, the invention provides a solar panel cleaning formulation, wherein the antimicrobial agent is selected from the group consisting of chloramphenicol, macrolides, tetracycline, aminglycoside, beta-lactam derivatives, ketoconazole, miconazole, penicillin, sulphonamides, vancomycin, phenothiazines, phenoxazines, carbazole and a combination thereof.

In yet one of the embodiments, the invention provides a solar panel cleaning formulation, wherein the antimicrobial agent is selected from the group consisting of phenothiazines, phenoxazines, carbazoles and sulphonamides and a combination thereof.

In yet one of the embodiments, the invention provides solar panel cleaning formulation, wherein the antimicrobial agent is based on phenothiazine.

In yet one of the embodiments, the invention provides a solar panel cleaning formulation, comprising; cetyl pyridinium chloride, sodium lauryl ether sulfate, urea, citric acid, phosphoric acid, phenothiazine based antimicrobial agent and water.

In yet one of the embodiments, the invention provides a solar panel cleaning formulation, wherein the cetyl pyridinium chloride is in a range of 0.3-0.4%, the sodium lauryl ether sulfate is in a range of 0.3-0.4%, the urea is in a range of 0.2-0.3%, the citric acid is in a range of 0.25-0.35%, phosphoric acid is in a range of 0.25-0.35%, phenothiazine based antimicrobial agent is in a range of 0.1-0.2%, and water is 98%, wherein all the percentages are weight percentages relative to the total weight of the solar panel cleaning formulation.

In yet one of the embodiments, the invention provides a solar panel cleaning formulation, comprising cetyltrimethyl ammonium bromide, sodium lauryl ether sulfate, urea, citric acid, phosphoric acid, phenothiazine based antimicrobial agent and water.

In yet one of the embodiments, the invention provides a solar panel cleaning formulation, wherein cetyltrimethyl ammonium bromide in a range of 0.3-0.4%, sodium lauryl ether sulfate in a range of 0.3-0.4%, urea in a range of 0.2-0.3%, citric acid in a range of 0.25-0.35%, phosphoric acid in a range of 0.25-0.35%, phenothiazine based antimicrobial agent in a range of 0.1-0.2%, and water is 98%, wherein all the percentages are weight percentages relative to the total weight of the solar panel cleaning formulation.

In yet one of the embodiments, the invention provides a solar panel cleaning formulation, wherein the antimicrobial agent is 4-(tert-butyl)-N-(4-(4-(5-oxo-5H-benzo[a]phenothiazin-6-ylamino)phenylsulfonyl)phenyl)benzamide (5).

In a preferred embodiment embodiments, the invention provides a solar panel cleaning formulation, wherein the antimicrobial agent is 4-(tert-butyl)-N-(4-(4-(5-oxo-5H-benzo[a]phenothiazin-6-ylamino)phenylsulfonyl)phenyl) benzamide or a compound of formula (5).

In at least one of the embodiments, the present invention provides a compound having the chemical formula: $C_{39}H_{31}N_3O_4S_2$. In certain embodiments, the present invention provides a compound having a structure according to formula (5):

(5)

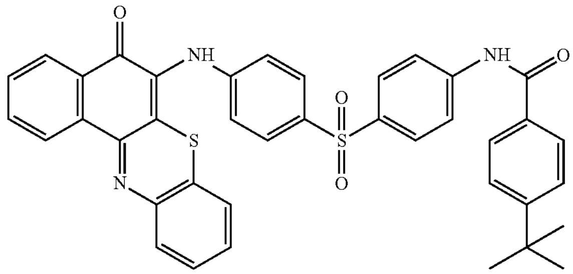

In a non-limiting, exemplary process for the preparation of compound of formula (5), the process comprises:

a) adding 2,3-dichloro-1,4-naphthoquinone (1), 4-aminophenyl sulfone (2) and 900 mL double distilled deionized water to obtain a first reaction mixture;
b) refluxing the first reaction mixture for 3 hours to obtain a compound 2-((4-((4-aminophenyl) sulfonyl)phenyl) amino)-3-chloronaphthalene-1,4-dione (3);
c) dissolving compound (3) and 2-aminothiophenol in 500 mL of acetonitrile to obtain a second reaction mixture;
d) refluxing the second reaction mixture with potassium carbonate for 2 hours to obtain a compound (4) 6-(4-(4-aminophenylsulfonyl)phenylamino)-5H-benzo[a] phenothiazin-5-one;
e) dissolving compound (4) and 4-tert-butylbenzoyl chloride in 250 mL of dried acetone to obtain a third reaction mixture; and
f) refluxing the third reaction mixture for 30 minutes by constant stirring to obtain the compound (5) 4-(tert-butyl)-N-(4-(4-(5-oxo-5H-benzo[a]phenothiazin-6-ylamino)phenylsulfonyl)phenyl)benzamide.

EXAMPLES

Example 1. Preparation of Antimicrobial Agent Compound of Formula (5) ($C_{39}H_{31}N_3O_4S_2$)

2,3-Dichloro-1,4-naphthoquinone (1) (2.270 grams ("g"), 10 mmol) and 4-aminophenyl sulfone (2) (2.048 g, 10 mmol) were combined in a round bottomed flask. Following this, double distilled deionized water (900 mL) was introduced, and the resulting mixture was refluxed for 3 hours. Once the reaction was complete, a deep red precipitate formed, which was then filtered, washed with hot water (1000 mL), and dried at 40° C. The crude product underwent purification through column chromatography (silica gel 100-200 mesh, ethyl acetate:hexane, 1:2) to yield compound 2-((4-((4-aminophenyl) sulfonyl)phenyl)amino)-3-chloronaphthalene-1,4-dione (3) as deep red crystals (88%). Subsequently, compound 3 (2.19 g, 5 mM) and 2-aminothiophenol (0.625 g, 5 mM) were dissolved in acetonitrile (500 mL) and reacted with potassium carbonate (1 equiv.) under reflux conditions for 2 hours. The product formation was monitored using thin-layer chromatography (TLC, ethyl acetate/hexane, 1:2, v/v). Once the reaction was complete, the mixture was cooled, poured into ice-cold water (1000 mL), and the resulting precipitate was isolated via vacuum filtration. The crude product was then dried in a hot air oven at 55° C. Purification of the crude sample was achieved through column chromatography (silica gel, 100-200 mesh, ethyl acetate/hexane, 1:2, v/v) to obtain the compound 6-(4-(4-aminophenylsulfonyl)phenylamino)-5H-benzo[a]phenothiazin-5-one (4). Mixing 0.518 g of compound 4 (1 mM) with 0.196 g of 4-tert-butylbenzoyl chloride (1 mM) in dried acetone (250 mL) resulted in a completely dissolved solution. The reaction mixture was then refluxed for 30 minutes with continuous stirring. The progress of the reaction and the formation of the product were monitored using TLC (ethyl acetate/hexane, 1:2, v/v). Subsequently, the reaction mixture was poured into ice-cold water (900 mL), yielding a light purple precipitate that was separated via vacuum filtration. The obtained sample was washed with double-distilled water (1500 mL) and dried at 55° C. The crude product was further purified using column chromatography (silica gel, 100-200 mesh, eluting solvents=ethyl acetate/hexane, 1:2, v/v), resulting in the antimicrobial agent 4-(tert-butyl)-N-(4-(4-(5-oxo-5H-benzo[a]phenothiazin-6-ylamino)phenylsulfonyl)phenyl)benzamide (5).

Example 2. Preparation of Solar Panel Cleaning Formulations

The above-stated chemical components (about 0.2-0.3%) were taken in required quantities and added one by one into a round bottom flask which is filled with about 98% water, by weight. These components were thoroughly solubilized for 30 minutes at room temperature to get a homogenous formulation. Fifteen different formulations were prepared and were evaluated for stability and pH. The formulations were kept at room temperature for 15 days without any interference and the stability and pH were checked. The particle size decreased/increased with the increasing/decreasing pH at a given time frame resulting in the aggregation of the chemicals in the solution that further affect the stability of the formulation. Based on the results, the for- Scheme 1 illustrates the synthesis of phenothiazine-based heterocyclic moieties from naphthoquinone.

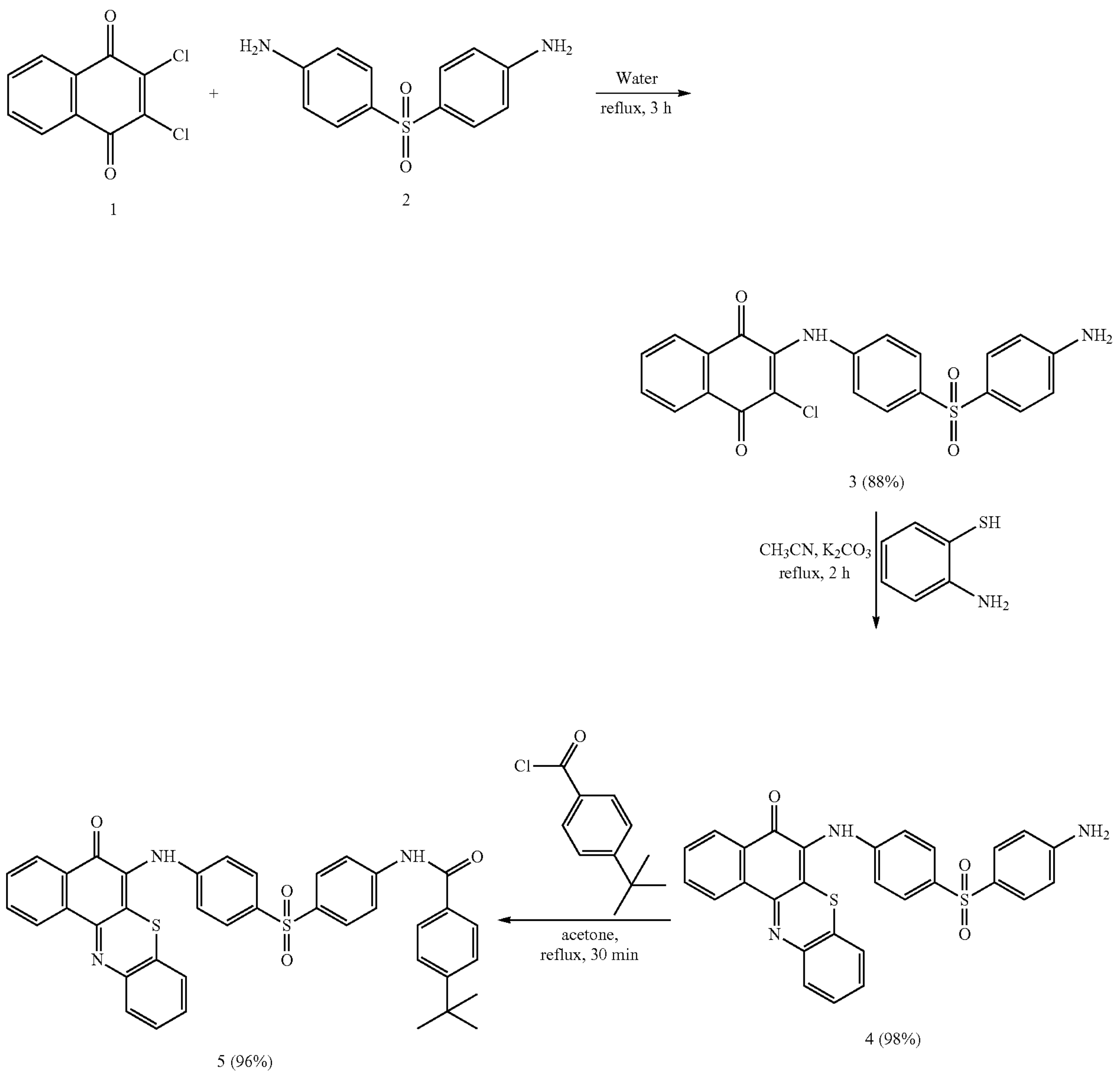

1 + 2

3 (88%)

4 (98%)

5 (96%)

mulations such as SR-01 and SR-02 were finalized for a performance study that showed better stability and pH parameters.

The complete details of finalized solar panel cleaning formulations are tabulated below (Tables 1, 2 and 3).

Figure 2A:
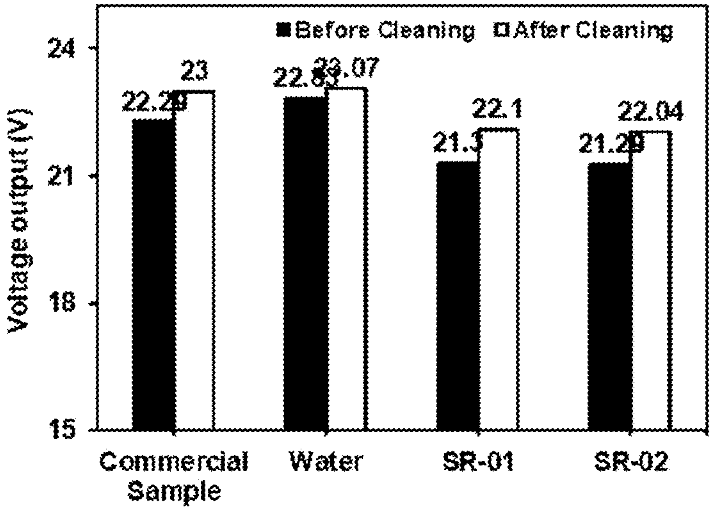
FIG. 2A illustrates the voltage measurement of the commercial sample, water (blank), SR-01, and SR-02 in solar panel surface.
Figure 2B:
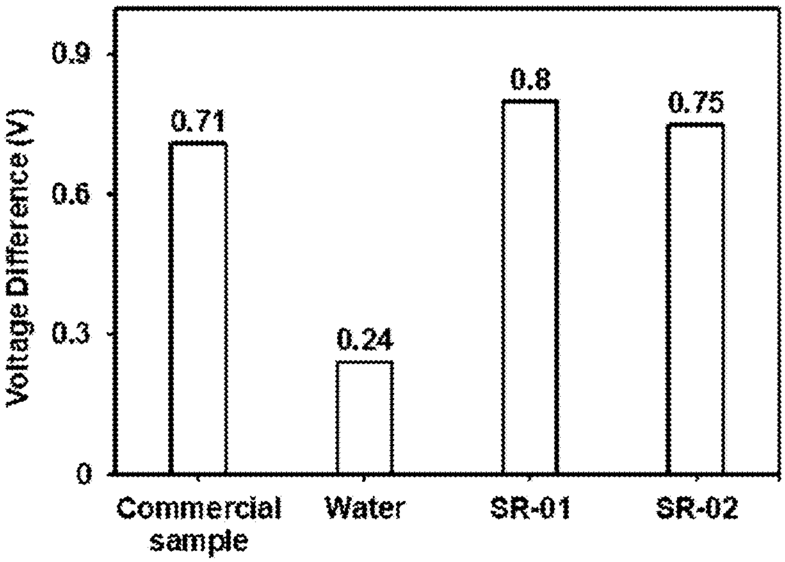
FIG. 2B illustrates the voltage difference of commercial sample, water (blank), SR-01, and SR-02 in solar panel surface (calculated from the voltage difference before and after cleaning).
Figure 2C:
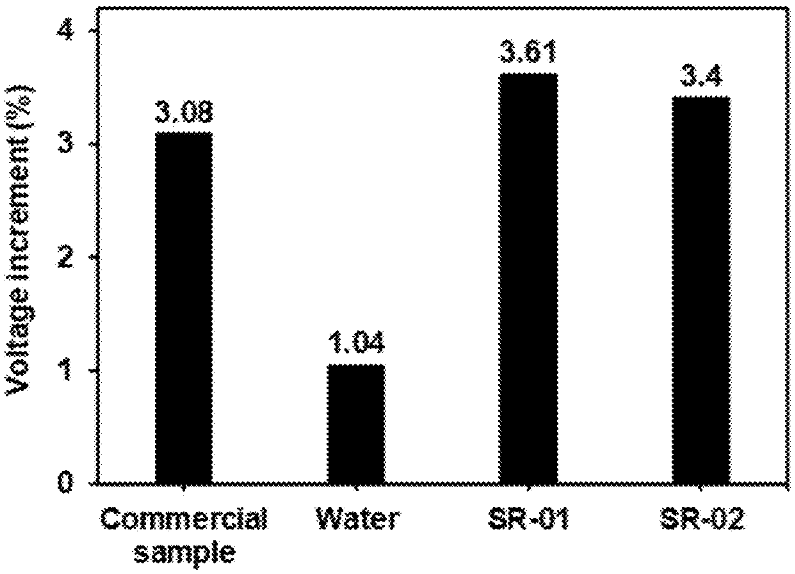
FIG. 2C illustrates the percentage of voltage difference before and after cleaning.

Based on the adopted cleaning protocols, the voltage was measured before and after cleaning with prepared solar panel cleaning formulations such as SR-01, and SR-02 and commercial sample on the solar surfaces (FIG. 1). For the study, 24"×21" (1.96 feet×1.80 feet) size solar panel was selected. The initial voltage was measured (before cleaning) at 21.30 V (DC). Interestingly, after cleaning, the voltage output was increased to 22.10 with the formulation SR-01. The voltage difference before and after the cleaning of the solar panel was 0.8 V. Though, slightly less voltage output was obtained for formulation SR-02 (0.75 V). However, both the formulations presented with better cleaning efficiency than the commercial sample (0.71 V) (see FIGS. 2A and 2B). Commercial sample contains cationic surfactant, non-ionic surfactant, urea hypochlorite and citric acid. Also, water was used as a blank to clean the surface which showed a voltage increment of 0.24 V, indicates that the cleaning of solar panel with water is not an efficient method for better efficiency.

TABLE 1

| S. No. | Formulations | Cetyl pyridinium chloride (wt. %) | Cetyltrimethyl ammonium bromide (wt. %) | Sodium lauryl ether sulfate (wt. %) | Urea (wt. %) | Citric acid (wt. %) | O-Phosphoric acid (wt. %) | Antimicrobial agent ($C_{39}H_{31}N_3O_4S_2$) (wt. %) | Water (wt. %) |
|---|---|---|---|---|---|---|---|---|---|
| 1. | SR-01 | 0.4 | 0 | 0.4 | 0.3 | 0.35 | 0.35 | 0.2 | 98 |
| 2. | SR-02 | 0 | 0.4 | 0.4 | 0.3 | 0.35 | 0.35 | 0.2 | 98 |
| 3. | SR-03 | 0.4 | 0 | 0.4 | 0 | 0.75 | 0.35 | 0.1 | 98 |
| 4. | SR-04 | 0.4 | 0 | 0.4 | 0.3 | 0 | 0.7 | 0.2 | 98 |
| 5. | SR-05 | 0 | 0.4 | 0 | 0.7 | 0.35 | 0.5 | 0.05 | 98 |
| 6. | SR-06 | 0 | 0 | 0.8 | 0.3 | 0.35 | 0.35 | 0.2 | 98 |
| 7. | SR-07 | 0.3 | 0.2 | 0.3 | 0.3 | 0.35 | 0.35 | 0.2 | 98 |
| 8. | SR-08 | 0.8 | 0 | 0 | 0.3 | 0.4 | 0.4 | 0.1 | 98 |
| 9. | SR-09 | 0 | 0.8 | 0.4 | 0.3 | 0.35 | 0.35 | 0.2 | 98 |
| 10. | SR-10 | 0.4 | 0 | 0.4 | 0.3 | 0.7 | 0 | 0.2 | 98 |
| 11. | SR-11 | 0.2 | 0 | 0.2 | 0.5 | 0.45 | 0.45 | 0.2 | 98 |
| 12. | SR-12 | 0.5 | 0 | 0.5 | 0.2 | 0.25 | 0.25 | 0.3 | 98 |
| 13. | SR-13 | 0 | 0.5 | 0.5 | 0.2 | 0.2 | 0.2 | 0.4 | 98 |
| 14. | SR-14 | 0.5 | 0 | 0.5 | 0 | 0.45 | 0.35 | 0.2 | 98 |
| 15. | SR-15 | 0 | 0.5 | 0.5 | 0.45 | 0 | 0.35 | 0.2 | 98 |

TABLE 2

| Formulations | Stability | pH |
|---|---|---|
| SR-01 | No precipitate/No settlement of chemical components | 6.5 |
| SR-02 | No precipitate/No settlement of chemical components | 6.3 |
| SR-03 | Less precipitated/settle down (mild) | 5.0 |
| SR-04 | Precipitated/settle down | 5.0 |
| SR-05 | Less precipitated/settle down (mild) | 4.5 |
| SR-06 | Precipitated/settle down | 5.0 |
| SR-07 | Precipitated/settle down | 5.0 |
| SR-08 | Precipitated/settle down | 5.0 |
| SR-09 | Less precipitated/settle down (mild) | 4.5 |
| SR-10 | Precipitated/settle down | 6.0 |
| SR-11 | Precipitated/settle down | 5.8 |
| SR-12 | Precipitated/settle down | 6.0 |
| SR-13 | Precipitated/settle down | 6.0 |
| SR-14 | Precipitated/settle down | 6.0 |
| SR-15 | Precipitated/settle down | 6.0 |

TABLE 3

| The main components of finalized solar panel cleaning formulations. | |
|---|---|
| SR-01 | Cetyl pyridinium chloride (0.4 wt %), sodium lauryl ether sulfate (0.4 wt %), urea (0.3 wt %), citric acid (0.35 wt %), phosphoric acid (0.35 wt %), phenothiazine based antimicrobial agent (0.2 wt. %), water (98 wt. %). |
| SR-02 | Cetyltrimethyl ammonium bromide (0.4 wt %), sodium lauryl ether sulfate (0.4 wt %), urea (0.3 wt %), citric acid (0.35 wt %), phosphoric acid (0.35 wt %), phenothiazine based antimicrobial agent (0.2 wt. %), water (98 wt. %) |

Performance Evaluation of the Solar Panel Cleaning Formulation of the Present Invention.

Voltage Measurement Study

Test Conditions

Step 1: Voltage measured between terminals of solar panel under natural sunlight.

Step 2: Cleaned the panel from the sample evenly over the surface.

Step 3: Voltage measured between terminals of the solar panel after treatment under natural sunlight.

Antimicrobial Study

To study the antimicrobial efficiency of prepared solar panel cleaning formulations, the microbial inhibition study was performed by using the serial dilution method. For the study, five gram-positive (*Staphylococcus Aureus*)/negative (*Pseudomonas Aeruginosa, Escherichia Coli, Klebsiella Pneumonia*, and *Salmonella Typhi*) bacteria and one fungus (*Candida Albicans*) were used for the investigation. The initial concentration of microbial inoculum was used as $1.07\times10^5$ CFU/mL (colony formation unit). Next, 1 mL of sample was added to the inoculum and the rehydrated cultures were transferred to 500 mL of its corresponding media and incubated in a bath shaker (250 rpm) for 24 hours ("h") at a temperature of 37° C. The percentage of microbial reduction was calculated from the concentration of the final inoculum that was determined by plate count.

The antimicrobial study was carried out for prepared solar panel cleaning formulations such as SR-01 and SR-02. The outcome of the results was compared with the commercial sample. The results indicate that the current formulations are highly active against the panel of bacteria and fungus. Besides, the commercial sample did not kill or reduce any microbial growth. It is noteworthy to mention that both the formulations are showing a high inhibition rate of more than 99%. These results clearly say that the prepared cleaning solutions could be able to kill the microorganisms at a higher inhibition rate (Table 4). ASTM E2315: 2016—Antimicrobial activity using time—kill test.

TABLE 4

Antimicrobial study of solar panel cleaning formulations of the present invention.

| Microorganisms | SR-01 (% reduction) | SR-02 (% reduction) | Commercial Sample (% reduction) |
|---|---|---|---|
| *Staphylococcus aureus* | 99.98 | 99.99 | No activity |
| *Pseudomonas aeruginosa* | 99.99 | 99.96 | No activity |
| *Escherichia coli* | 99.99 | 99.98 | 87.5 |
| *Klebsiella pneumonia* | 99.99 | 99.96 | 37.5 |
| *Salmonella typhi* | 99.99 | 99.96 | No activity |
| *Candida albicans* | 99.99 | 99.00 | 1.26 |

Corrosion Study

To find out the corrosion properties of the prepared solar panel cleaning formulations, the corrosion study was carried out by using the potentiodynamic polarization technique (ASTM G59-97 (2020)—Standard Test Method for Conducting Potentiodynamic Polarization Resistance Measurements). The potential window of-300 mV to 1200 mV was used for the study. The aqueous silver electrode (Ag/AgCl) was used as a reference electrode with a scan rate of 10 m V/s.

Figure 3A:
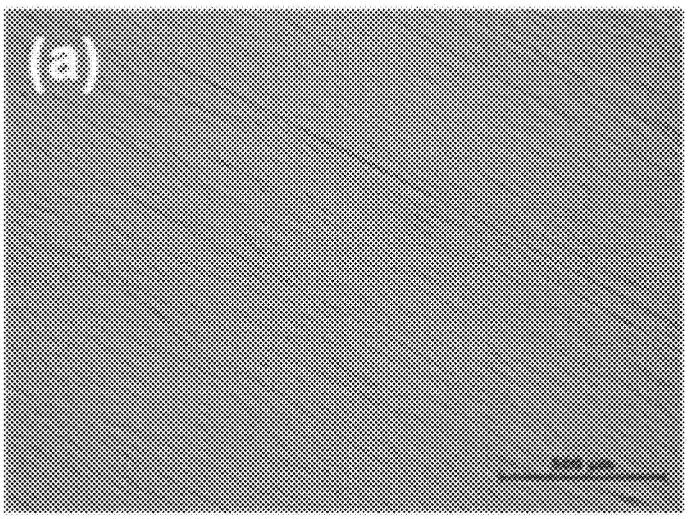
FIGS. 3A and 3B illustrate the microscopic images of metal surface treated with the SR-01 formulation or the SR-02 formulation, respectively.
Figure 3B:
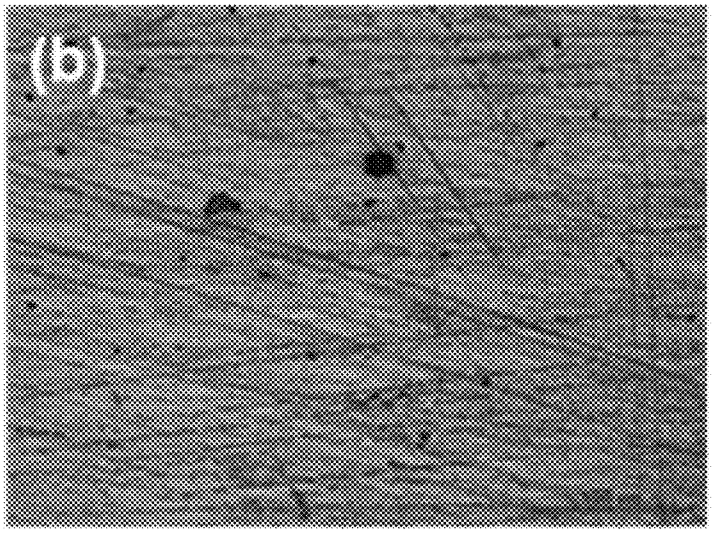
Figure 3C:
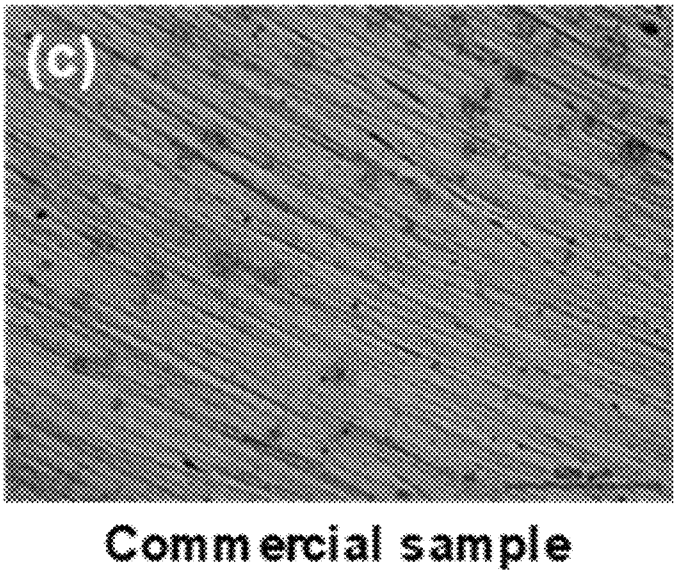
FIG. 3C illustrates the microscopic images of metal surface treated with commercial sample.

The results obtained from the investigation indicate that the solar panel cleaning formulation SR-01 and SR-02 show better corrosive resistance (0.6716 and 0.0245 mm/year, respectively) than the commercial sample (8.6169 mm/year). Notably, the formulation SR-01 did not show any pitting on the metal surfaces (FIG. 3A). Though SR-02 displayed a very low corrosion rate, nevertheless, it induced pitting (FIG. 3B). Higher corrosive behavior was observed from the commercial sample (FIG. 3C). Overall, the formulation SR-01 presented better corrosive resistance than the other samples investigated. The pitting was observed in SR-02 due to the presence of bromide ions. The acidic strength of bromide is higher than that of chloride which induced the pitting on the metal surface (Table 5).

TABLE 5

Corrosive resistance study of the solar panel cleaning formulations of the present invention.

| Formulations | Corrosion rate (CR, mm/year) | Observations |
|---|---|---|
| SR-01 | 0.6716 | No pitting observed |
| SR-02 | 0.024552 | Pitting observed |
| Commercial sample | 8.6169 | Pitting observed |

The results obtained from the investigation indicate that the solar panel cleaning formulation SR-01 and SR-02 show better corrosive resistance (0.6716 and 0.0245 mm/year, respectively) than the commercial sample (8.6169 mm/year). Notably, the formulation SR-01 did not show any pitting on the metal surfaces. Though SR-02 displayed a very low corrosion rate, nevertheless, it induced pitting. Higher corrosive behavior was observed from the commercial sample. Overall, the formulation SR-01 presented better corrosive resistance than the other samples investigated. The pitting was observed in SR-02 due to the presence of bromide ions. The acidic strength of bromide is higher than that of chloride which induced the pitting on the metal surface.

Overall, the present formulation SR-01 was capable of showing high cleaning efficiency in terms of higher voltage output, better antimicrobial activity and low-corrosive properties (Table 6).

TABLE 6

Comparison of overall properties of all solar panel cleaning formulations with the commercial sample.

| Formulations | Cleaning efficiency | Antimicrobial activity | Corrosive property | Pitting property |
|---|---|---|---|---|
| SR-01 | High (0.8 V) | Yes (more than 99%) | Low-corrosive | No pitting |
| SR-02 | High (0.75 V) | Yes (more than 99%) | Low-corrosive | Pitting observed |
| Commercial sample | Low (0.71 V) | No activity | Highly corrosive | Pitting observed |

The following ASTM methods were adopted for the experiments.

ASTM WK87344—New Guide for Standard Guide for Solar Panel Cleaning Safety.

TECHNICAL ADVANTAGES ACHIEVED BY CERTAIN ASPECTS AND/OR EMBODIMENTS OF THE INVENTION

Certain aspects and/or embodiments disclosed herein may achieve one or more of the following advantages over the typical conventional solar panel cleaning formulations:

The prepared solar panel cleaning formulation SR-01 and SR-02 showed better performance properties.

The outcome of the preliminary results suggests that the solar panel cleaning formulation SR-01 showed superior performance in terms of high cleaning efficiency and higher voltage output.

Formulation SR-01 showed better antimicrobial property than a bench mark chemical.

Formulation SR-01 showed low-corrosive behavior which is more predominate for the cleaning applications.

We claim:

1. A solar panel cleaning formulation, comprising: a surfactant, urea, a mild acid, an antimicrobial agent, and water, wherein the surfactant is in a range of 0.6-0.8 wt. %, the urea is in a range of 0.2-0.3 wt. %, the mild acid is in a range of 0.6-0.7 wt. %, the antimicrobial agent is in a range of 0.1-0.2 wt. %, and water is 98 wt. %, wherein all weight percentages are based on a total weight of the solar panel cleaning formulation.

2. The solar panel cleaning formulation as claimed in claim 1, wherein the surfactant includes one or more cationic surfactants or anionic surfactants selected from the group consisting of behentrimonium chloride, benzalkonium chloride, benzethonium chloride, benzododecinium bromide, carbethopendecinium bromide, cetalkonium chloride, cetrimide, cetrimonium bromide, cetrimonium chloride, cetylpyridinium chloride, didecyldimethylammonium chloride, dimethyldioctadecylammonium bromide, dimethyldioctadecylammonium chloride, dioleoyl-3-trimethylammonium propane, domiphen bromide, ethyl lauroyl arginate, lauryl methyl gluceth-10 hydroxypropyl dimonium chloride, octenidine dihydrochloride, olaflur, n-oleyl-1,3-propanediamine, pahutoxin, stearalkonium chloride, tetramethylammonium hydroxide, thonzonium bromide, 2-acrylamido-2-methylpropane sulfonic acid, alkylbenzene sulfonate, ammonium lauryl sulfate, ammonium perfluorononanoate, chlorosulfolipid, disodium cocoamphodiacetate, docusate, magnesium laureth sulfate, α-olefin sulfonate, perfluorobutanesulfonic acid, perfluorodecanoic acid, perfluorohexanesulfonic acid, perfluorononanoic acid, perfluorooctanesulfonic acid, perfluorooctanoic acid, perfluoropropanesulfonic acid, phospholipid, potassium lauryl sulfate, sodium dodecyl sulfate, sodium laurate, sodium lauryl ether sulfate, sodium lauroyl sarcosinate, sodium myreth sulfate, sodium nonanoyloxybenzenesulfonate, sodium pareth sulfate, sodium stearate, sodium sulfosuccinate esters, sodium tetradecyl sulfate, sulfolipid, cetyltrimethyl ammonium bromide, and a combination thereof.

3. The solar panel cleaning formulation as claimed in claim 1, wherein the mild acid includes one or more selected from the group consisting of acetic acid, citric acid, formic acid, o-phosphoric acid, acetylsalicylic acid, carbonic acid, phosphorous acid, and a combination thereof.

4. The solar panel cleaning formulation as claimed in claim 1, wherein the antimicrobial agent is selected from the group consisting of chloramphenicol, macrolides, tetracycline, aminglycoside, beta-lactam derivatives, ketoconazole, miconazole, penicillin, sulphonamides, vancomycin, phenothiazines, phenoxazines, carbazole, and a combination thereof.

5. The solar panel cleaning formulation as claimed in claim 1, wherein the formulation comprises cetyl pyridinium chloride, sodium lauryl ether sulfate, urea, citric acid, phosphoric acid, phenothiazine based antimicrobial agent, and water.

6. The solar panel cleaning formulation as claimed in claim 1, wherein the formulation comprises cetyltrimethyl ammonium bromide, sodium lauryl ether sulfate, urea, citric acid, phosphoric acid, phenothiazine based antimicrobial agent, and water.

7. The solar panel cleaning formulation as claimed in claim 1, wherein the antimicrobial agent is 4-(tert-butyl)-N-(4-(4-(5-oxo-5H-benzo[a]phenothiazin-6-ylamino)phenylsulfonyl)phenyl) benzamide.

8. A compound of formula (5);

(5)

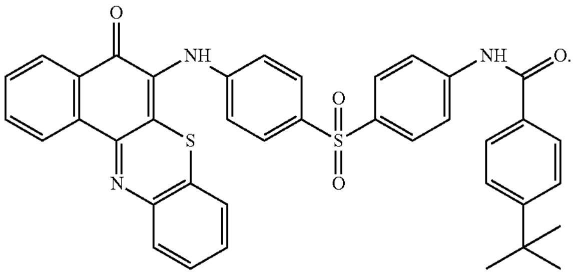

9. A process for preparing a compound as claimed in claim 8, the process comprising;

a) adding 2,3-dichloro-1,4-naphthoquinone, 4-aminophenyl sulfone, and 900 mL double distilled deionized water to obtain a first reaction mixture;

b) refluxing the first reaction mixture for 3 hours to obtain a 2-((4-((4-aminophenyl) sulfonyl)phenyl)amino)-3-chloronaphthalene-1,4-dione compound;

c) dissolving the 2-((4-((4-aminophenyl) sulfonyl)phenyl) amino)-3-chloronaphthalene-1,4-dione compound compound and 2-aminothiophenol in 500 mL of acetonitrile to obtain a second reaction mixture;

d) refluxing the second reaction mixture with potassium carbonate for 2 hours to obtain a 6-(4-(4-aminophenylsulfonyl)phenylamino)-5H-benzo[a]phenothiazin-5-one compound;

e) dissolving the 6-(4-(4-aminophenylsulfonyl)phenylamino)-5H-benzo[a]phenothiazin-5-one compound and 4-tert-butylbenzoyl chloride in 250 ml of dried acetone to obtain a third reaction mixture;

f) refluxing the third reaction mixture for 30 minutes by constant stirring to obtain the compound of Formula (5).

10. A solar panel cleaning formulation, comprising: a surfactant, urea, a mild acid, an antimicrobial agent, and water, wherein the antimicrobial agent is 4-(tert-butyl)-N-(4-(4-(5-oxo-5H-benzo[a]phenothiazin-6-ylamino)phenylsulfonyl)phenyl) benzamide.

11. The solar panel cleaning formulation as claimed in claim 10, wherein the antimicrobial agent is present in a range of 0.1-0.2 wt. %, based on a total weight of the solar panel cleaning formulation.

12. The solar panel cleaning formulation as claimed in claim 10, wherein the antimicrobial agent is present in a range of 0.1-0.2 wt. %, based on a total weight of the solar panel cleaning formulation.

13. The solar panel cleaning formulation as claimed in claim 10, wherein the surfactant is present in a range of 0.6-0.8 wt. %, based on a total weight of the solar panel cleaning formulation.

14. The solar panel cleaning formulation as claimed in claim 10, wherein the urea is present in a range of 0.2-0.3 wt. %, based on a total weight of the solar panel cleaning formulation.

15. The solar panel cleaning formulation as claimed in claim 10, wherein the mild acid is present in a range of 0.6-0.7 wt. %, based on a total weight of the solar panel cleaning formulation.

16. The solar panel cleaning formulation as claimed in claim 10, wherein the surfactant includes one or more cationic surfactants or anionic surfactants selected from the group consisting of behentrimonium chloride, benzalkonium chloride, benzethonium chloride, benzododecinium bromide, carbethopendecinium bromide, cetalkonium chloride, cetrimide, cetrimonium bromide, cetrimonium chloride, cetylpyridinium chloride, didecyldimethylammonium chloride, dimethyldioctadecylammonium bromide, dimethyldioctadecylammonium chloride, dioleoyl-3-trimethylammonium propane, domiphen bromide, ethyl lauroyl arginate, lauryl methyl gluceth-10 hydroxypropyl dimonium chloride, octenidine dihydrochloride, olaflur, n-oleyl-1,3-propanediamine, pahutoxin, stearalkonium chloride, tetramethylammonium hydroxide, thonzonium bromide, 2-acrylamido-2-methylpropane sulfonic acid, alkylbenzene sulfonate, ammonium lauryl sulfate, ammonium perfluorononanoate, chlorosulfolipid, disodium cocoamphodiacetate, docusate, magnesium laureth sulfate, α-olefin sulfonate, perfluorobutanesulfonic acid, perfluorodecanoic acid, perfluorohexanesulfonic acid, perfluorononanoic acid, perfluorooctanesulfonic acid, perfluorooctanoic acid, perfluoropropanesulfonic acid, phospholipid, potassium lauryl sulfate, sodium dodecyl sulfate, sodium laurate, sodium lauryl ether sulfate, sodium lauroyl sarcosinate, sodium myreth sulfate, sodium nonanoyloxybenzenesulfonate, sodium pareth sulfate, sodium stearate, sodium sulfosuccinate esters, sodium tetradecyl sulfate, sulfolipid, cetyltrimethyl ammonium bromide, and a combination thereof.

* * * * *